United States Patent [19]

Forrest, Jr. et al.

[11] Patent Number: 5,753,172
[45] Date of Patent: May 19, 1998

[54] FILM BEAD HEATING FOR SIMULTANEOUS STRETCHING

[75] Inventors: Albert White Forrest, Jr., Chillicothe; David Edward Heyer; Charles Nelson Jolliffe, both of Circleville, all of Ohio

[73] Assignee: E. I. du Pont de Nemours and Company, Wilmington, Del.

[21] Appl. No.: 763,819

[22] Filed: Dec. 11, 1996

[51] Int. Cl.⁶ .................................................. B29C 55/16
[52] U.S. Cl. .................. 264/481; 264/216; 264/235.8; 264/290.2; 425/174.4
[58] Field of Search ................................ 264/446, 447, 264/448, 476, 290.2, 479, 481, 216, 492, 235.8; 425/174.4

[56] References Cited

U.S. PATENT DOCUMENTS 4,237,088  12/1980  Yoshimura et al. ............... 264/290.2
4,652,409   3/1987  Leese et al. ..................... 264/290.2
5,429,785   7/1995  Jolliffe .............................. 264/216

Primary Examiner—Mathieu D. Vargot

[57] ABSTRACT

An improved process for simultaneous biaxial stretching of a thermoplastic polymer film having beaded edges in a tenter frame consisting of gripping the beaded edges of the film with tenter clips and increasing the temperature of the beaded edges to within the film orientation temperature range prior to or during simultaneous stretching, and in subsequent stretching or heat-setting steps, by focusing heat on the beaded edges of the film. Thermoplastic films, such as polyethylene terephthalate and polyethylene naphthalate, having a final thickness of from 0.2 to 350 microns after simultaneous stretching can be prepared.

18 Claims, 1 Drawing Sheet

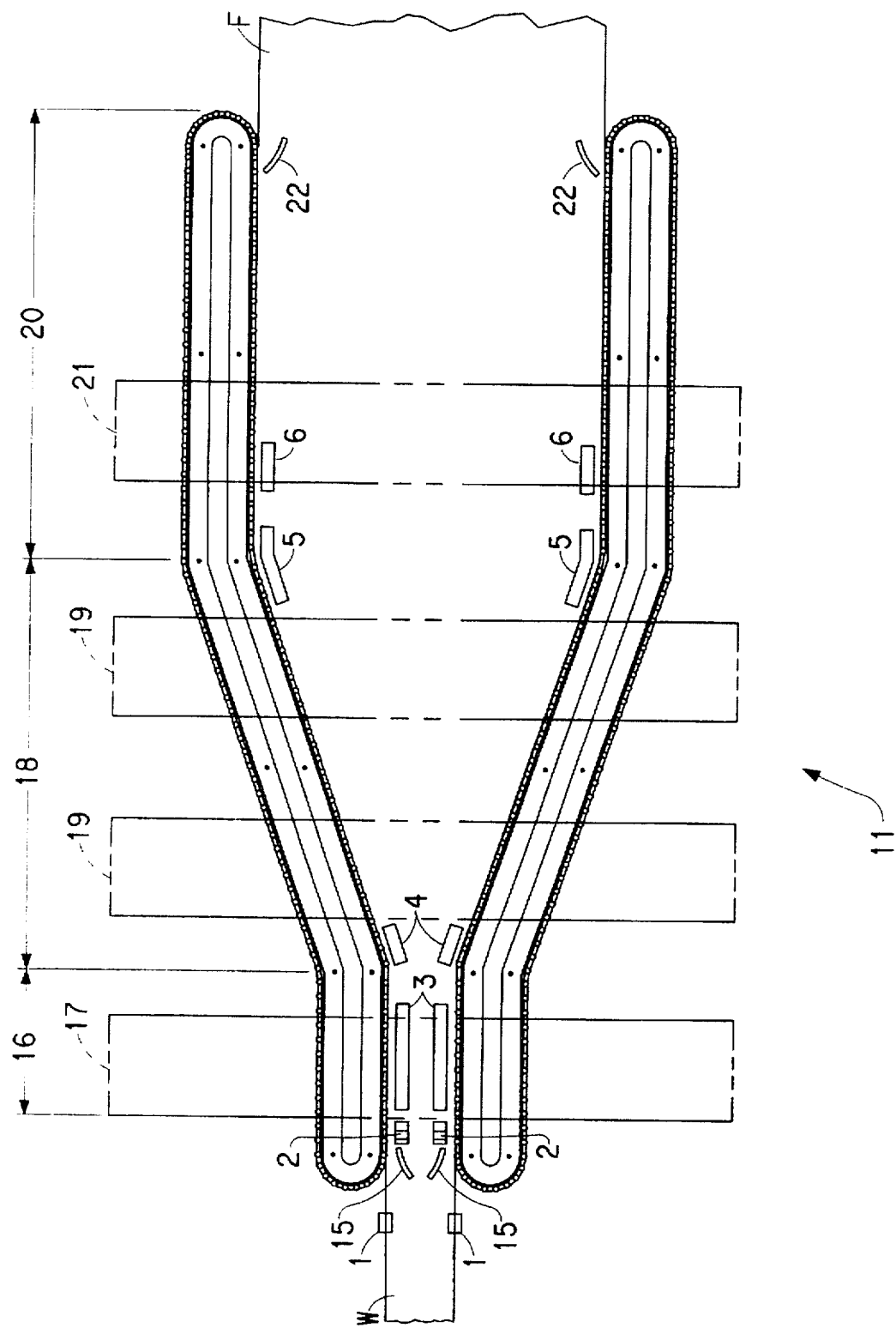

FILM BEAD HEATING FOR SIMULTANEOUS STRETCHING

BACKGROUND OF THE INVENTION

1. Field of the Invention

The present invention is directed to the preparation of biaxially oriented thermoplastic films.

More specifically, the present invention pertains to a biaxially oriented thermoplastic film, such as polyethylene terephthalate or polyethylene naphthalate, prepared by simultaneous biaxial stretching in a tenter frame stretcher, wherein the film is simultaneously stretched in both the machine and cross-machine directions while the two beaded edges of the film are held by gripping devices propelled along tracks. By increasing the temperature of the beaded edges of the film to within the appropriate film orientation temperature range before or during simultaneous stretching, more reliable gripping of the edges, reduction in film breaks and greater uniformity of the film edges can be obtained.

2. Description of the Prior Art

Commercially useful films of thermoplastic polymers, such as polyethylene terephthalate or polyethylene naphthalate, are conventionally made by the steps of:

(1) forming an initial as-cast film by extruding a continuous flat sheet of molten polymer onto a cooled, moving metal surface, usually the surface of a rotating cylindrical roll or drum, which cools and solidifies the molten polymer sheet;

(2) imparting molecular orientation to the film to improve its strength and other mechanical properties by stretching the film in a biaxial stretching apparatus; and (3) advancing the oriented film to a film transfer and winding section, which typically includes slitting knives for removing the edges and for dividing the film into more than one final sheet width and finally equipment for winding the sheet into rolls.

Suitable types of biaxial stretchers include sequential stretchers containing at least two stretching sections for imparting orientation first in one direction (machine or cross-machine) and then in the other direction. Sequential stretchers typically impart machine direction orientation first by passing the film over rollers rotating at increasing speeds and then impart cross-machine orientation by means of a tenter frame stretcher. The film edges are gripped by moving tenter clips driven forward at constant speed on tracks which diverge to provide cross-machine direction orientation.

Alternatively, the stretcher can be a simultaneous biaxial stretcher which performs both machine direction and cross-machine direction orientation in a single step by gripping the edges of the as-cast film with tenter clips on tracks which diverge to impart cross-machine orientation, while the clips are driven forward at increasing speeds to impart machine direction orientation. The clip driving means used in the stretching section may be a mechanical device such as a large screw with pitch variably increasing along the clip path, such as described in U.S. Pat. No. 3,150,433 to Kampf, or linear electrical motors arranged to accelerate the clips as they advance through the stretching section, such as described in U.S. Pat. No. 5,051,225 to Hommes et al.

In the simultaneous biaxial stretching of plastic films, it is generally known that the temperature of the film to be stretched must first be adjusted to within a suitable orientation temperature range characteristic of the specific polymer. This is usually accomplished by passing the as-cast film through a preheating zone after the film edges have been gripped by the tenter clips with the clips moving at essentially constant speed and with the clip paths essentially parallel so that no stretching occurs. The film may be heated by any of the methods known in the art, usually either by impingement of hot air onto the film and/or by application of radiant heat from electrical heaters of various types.

Preheating of the film is then followed by simultaneous stretching in which the paths of the tenter clips gripping the film edges diverge to impart cross-machine direction orientation, while the clips are simultaneously accelerated to impart machine direction orientation. The film temperature may optionally be adjusted during stretching by further application of air of controlled temperature or of radiant energy.

A typical example of such a method is described in U.S. Pat. No. 5,429,785 to Jolliffe. According to the Jolliffe patent, a method is provided for making an ultra-thin, simultaneously biaxially stretched polymer film in a tenter frame by heating the film to the film orientation temperature in the tenter frame prior to stretching and maintaining the film within the film orientation temperature range using radiant heaters while simultaneously stretching the film in the tenter frame. The biaxially stretched film of the Jolliffe patent has a gauge uniformity suitable for commercial application with a thickness variation of typically less than 25%, thereby providing improved runnability and ready formation of smooth finished rolls.

It has now been found that during the simultaneous biaxial stretching step of such prior art processes, the thickness and temperatures of the edges of the film, referred to as "beads", are very critical. Bead edges are initially created as the film is cast. Normally the bead edges are somewhat thicker than the central film sheet. In simultaneous stretching, the beads act as cables attached to the edges of the film, providing cross-machine tension to the film between the tenter clips as the clips separate during the machine direction stretching. In the Hommes, et al. patent, the beads propel the passive (idler) clips and the beads themselves are stretched primarily in the machine direction, since no gripping exists between the clips to apply cross-machine force to the beads.

If the beads are not of appropriate thickness or within the orientation temperature range of the film, the beads may frequently break as they are elongated in the machine direction. The bead breaks propagate into the main sheet of the film interrupting the continuous operation needed to produce long rolls of stretched film required for commercial operation. In some cases with bead temperatures below the ideal orientation temperature range, the beads and the film can break continuously and emerge from the tenter frame in pieces generally less than a meter in length.

The heating method applied to the main portion of the film does not reliably heat the bead edges of the film to the proper temperature for orientation, especially when the bead edges are of a thickness appropriate for simultaneous biaxial stretching. The beads are usually much thicker than the film and therefore require greater heat input per unit area to reach the desired temperature. The beads also commonly receive even less heat input per unit area than the film because they are located at the edges of the heating equipment where they are partially shielded from the radiant heat source if the film is radiantly heated, or may receive less flow of hot air than the central film sheet if the film is heated by hot air. For these reasons the beads usually are considerably cooler than the film. In one instance, radiant heat raised the film temperature by 76° C., and the beads by only 3° C., in the absence of separate bead heating, in a preheating zone.

It is important in simultaneous stretching to avoid breaking the beads by using an appropriate bead thickness and heating the bead to an acceptable orientation temperature. If the bead temperature is above or below this acceptable temperature range, bead breaks will result.

The edges of films oriented in a simultaneous biaxial stretcher have a scalloped shape with indentations between the points gripped by the tenter clips. The scalloped edges are subsequently cut off after orientation and before the film is wound into rolls. If the bead temperatures are elevated above the ideal temperature range for orientation, the tension in the beads decreases and the scallop depths increase making it necessary to remove a wider strip of waste bead. This increased waste, reduces process efficiency and reduces the width of useful film that can be obtained.

In the simultaneous biaxial stretching apparatus described in U.S. Pat. No. 5,051,225 to Hommes et al, the tenter clips are driven by linear electric motors. It has been found that it is not necessary for the linear motors to propel all of the clips. It is more economical to drive only, for example, every third clip, the intervening two clips being propelled by engagement with the film beads. Beads of appropriate thickness are required to sustain the stretching forces and propel the passive clips. It has been found with the present process that a cast bead edge thickness of from 400 to 1000 microns, preferably from 600 to 800 microns, is preferred for a cast PET or PEN film having a thickness of less than 250 microns. If the beads are not the proper thickness or are not maintained in the appropriate temperature range to propel the passive, non-driven clips the beads may break. In addition, bead temperatures that are either too high or too low or beads that are too thin can cause the spacing of the passive clips to be nonuniform. Nonuniform spacing of the clips adversely affects the uniformity of the oriented film thickness and the physical properties of the film near the edges.

Furthermore, it is critically important in stretching films using a tenter frame for the tenter clips to grip the bead edges strongly and reliably. Reliable gripping by the tenter clips has been found to be affected by the temperature of the film at the point of gripping. If the temperature of the beads at the time of gripping is not sufficiently high to soften the beads and allow the clip jaws to indent the surface, reliable gripping is not obtained and the clips may release the film during stretching and interrupt the process. This is especially the case using a simultaneous biaxial stretcher where the force exerted on the clips by the film is not always normal to the clip axis because of the machine direction stretching forces.

Accordingly, the present invention provides a process for simultaneous biaxial stretching of a thermoplastic film containing beaded edges in a tenter frame wherein the temperatures of the bead edges of the film before and during stretching are raised to temperatures suitable for stretching, which avoids bead breaks which propagate into the film and interrupt the stretching process, minimizes the irregularities along the edges which result from unnecessarily high bead temperatures and enhances the reliability of gripping of the bead edges of the film by the tenter clips.

SUMMARY OF THE INVENTION

The present invention relates to a process for preparing a simultaneous biaxially stretched thermo-plastic film by casting a molten melt of thermoplastic polymer and cooling the polymer to form a film having beaded edges, gripping the beaded edges of the film with tenter clips and directing heat onto the film to heat the film to an orientation temperature range prior to stretching the film simultaneously in both the machine and cross-machine directions, wherein the improvement comprises increasing the temperature of the beaded edges of the film to within the film orientation temperature range prior to or during simultaneous stretching by focusing heat on the beaded edges of the film.

More particularly, the present invention relates to a process for preparing a thin, biaxially stretched thermoplastic film comprising the steps of (a) casting a molten thermoplastic polymer onto a quenching surface and cooling the polymer to form a self-supporting film having beaded edges;

(b) gripping the beaded edges of the film with tenter clips;

(c) moving the film into a tenter frame;

(d) heating the film to an orientation temperature in the tenter frame prior to stretching; and (e) simultaneously stretching the film biaxially to form a biaxially stretched thermoplastic film, wherein the temperature of the beaded edges of the film is increased to within the film orientation temperature range prior to or during simultaneous stretching by focusing heat on the beaded edges of the film.

The focus of heat on the beaded edges of the film is considered not to affect the temperature of the central portion of the film.

Thermoplastic films and particularly polyester films, such as polyethylene terephthalate and polyethylene naphthalate, having a final thickness after stretching, ranging at least from 0.2 microns to 350 microns may be stretched using this process. Generally the films are stretched at least 2 times, and preferably from 2 to 5 times, their original length in the machine direction, and at least 2 times, and preferably from 2 to 5 times, their original width in the cross-machine direction.

BRIEF DESCRIPTION OF THE DRAWING

FIG. 1 is a schematic top plan view of the tenter frame used to simultaneously biaxially stretch a thermoplastic film and illustrates the locations of the various bead heaters used according to the invention.

DETAILED DESCRIPTION OF THE INVENTION

The present invention relates to a process for preparing a biaxially oriented polymer film having beaded edges, which are generally thicker than the central portion of the film, and simultaneous biaxially stretching the film in a tenter frame, while increasing the temperature of the beaded edges of the film to within the film orientation temperature range before or during simultaneous biaxial stretching.

Heat can be applied selectively to the bead edges at any or all of the following stages of the process:

(1) non-contact bead heating before the film is gripped by the tenter clips which propel the film through the simultaneous stretcher;

(2) non-contact bead heating after the film is gripped by the tenter clips but before simultaneous stretching begins;

(3) non-contact bead heating during the simultaneous stretching process; and (4) non-contact bead heating prior to and during film processing steps downstream from the simultaneous stretcher, including further machine direction stretching to increase the strength of the film.

The choice of bead heating methods is not critical to the invention. However, the bead heating equipment must be capable of focusing heat toward the bead edges of the film with minimal or substantially no effect on the temperature of the central portion of the film, which is preferably controlled by separate means. Independent control of bead temperature is preferable so that bead temperatures can be adjusted for process reliability without affecting the temperature of the main central portion of the film.

Non-contact bead heating may be performed using hot air impingement by nozzles configured to direct a narrow stream of air along the bead and by radiant heating using electrical heaters. Electrical heaters include (1) flat narrow sheathed heaters mounted above or below the bead edges of the as-cast film and located before the tenter clip gripping point; (2) high intensity tubular radiant heaters with parabolic cylindrical reflectors mounted above or below the film and focused at the bead edges located after the tenter clip gripping point and before stretching begins; and (3) tubular sheathed heaters mounted parallel to the tenter clip paths above the film and close to the clips to maximize the heat input to the beads. Both hot air and radiant heaters can be used in the film preheat zone upstream from the simultaneous stretcher, within the simultaneous stretcher and in subsequent stretching operations and provide highly oriented films.

It has been found to be generally desirable for the temperature of the beads to be approximately equal to, or higher than, the temperature of the central film web. The film needs to be within an orientation temperature range suitable for the particular polymer. The beads acting as carriers for the film may be within or above the film orientation temperature range. The need for separate control of bead temperatures is driven both by the unequal heating applied to the beads compared to the film in typical stretcher heating zones, and by the need to separately optimize film and bead temperatures.

Suitable thermoplastic polymers include but are not limited to amorphous non-crystalline polymers such as polystyrene and polyacrylates as well as crystallizable polymers including polyolefins, polyamides, and polyesters. Preferred are crystallizable polyesters containing as the major acid component an aromatic dicarboxylic acid (or the lower alkyl ester thereof) and as the major glycol component an alkylene glycol. Examples of the aromatic dicarboxylic acid include but are not limited to terephthalic acid, isophthalic acid, naphthalenedicarboxylic acid, diphenoxyethanedicarboxylic acid, diphenyletherdicarboxylic acid, diphenylsulfodicarboxylic acid and diphenylketonedi-carboxylic acid. Most preferred are terephthalic acid or naphthalenedi-carboxylic acid. The preferred alkylene glycol is ethylene glycol. Suitable copolymerizable components which may be added to optimize properties of the desired films, as is well known in the art, include diols such as diethylene glycol, propylene glycol or neopentylglycol; aromatic diacid components such as phthalic acid and isophthalic acid; and aliphatic diacid components such as sebacic acid and adipic acid. Polyethylene terephthalate (PET) or polyethylene-2,6-naphthalate (PEN) are especially suitable for the film produced by this process. The process is also applicable to polyester copolymers of PET and PEN, copolymers comprising more that 70% by weight of either PET or PEN, and polymer blends formed by combination of suitable polymers providing that the blend exhibits orientation characteristics typical of PET and PEN during the film forming process.

The polymer may also contain insoluble (inorganic or organic) particles internally precipitated or externally added, as is well known in the art, to serve as a lubricant facilitating film handling including winding of the film roll.

Referring to the drawing, FIG. 1 shows a tenter frame stretcher 11 generally suitable for simultaneous biaxial stretching of a thermoplastic film, such as polyethylene terephthalate film or polyethylene naphthalate film. The locations of bead heaters 1 to 6 according to the present invention are described in the examples that follow.

Initially, a molten polyethylene terephthalate (PET) or polyethylene naphthalate (PEN) polymer is typically meltextruded through a slit orifice of a die and cast onto the quenching surface of an internally cooled, rotating quench drum held at a temperature of typically 30° C. to produce a substantially amorphous self-supporting film W.

The film W is stripped from the drum and moved over heated rollers into a pre-heating section 16 in tenter frame 11 where it is gripped 15 on both sides by tenter clips and heated to an orientation temperature prior to stretching. A source of heated air or radiant heat 17 is used to pre-heat the film. The orientation temperature range for polyethylene terephthalate (PET) is typically from 80° to 120° C. and the orientation temperature range for polyethylene naphthalate (PEN) is typically from 115° to 165° C. The orientation temperature range as referred to herein is the temperature range in which molecular orientation of a polymeric film may be effected. Below the orientation temperature range the film tends to break. Above the orientation temperature range the film elongates without orienting. The specific orientation range for a given thermoplastic polymer can be readily determined by one skilled in the art.

The film W is then moved into stretching section 18 where it is simultaneously biaxially stretched in the machine and cross-machine directions while the temperature is maintained within the orientation temperature range of the particular polymer using radiant or air heaters 19. The film is stretched at least two times its original dimensions in each direction.

After the film W has been biaxially stretched in stretching section 18, it is optionally moved into a heat setting section 20 of the tenter frame where further processing is performed while its temperature is adjusted using radiant or air heaters 21 to a range appropriate for the specific processing steps. These steps may include further stretching primarily in the machine direction and heat setting by elevating the temperature in order to dimensionally stabilize the film, or combinations of any of these steps.

Finally, the stretched film F is disengaged 22 from the tenter clips, the edges are trimmed off and the central film is wound into a roll.

The following examples further illustrate but in no way limit the present invention.

EXAMPLE 1

A linear motor tenter frame stretcher of the type described in U.S. Pat. No. 5,051,225 to Hommes was used to simultaneously biaxial stretch a polyethylene terephthalate film and the teachings of this patent are incorporated herein by reference. The only modifications required were the addition and use of radiant heaters to maintain the film at appropriate temperatures for heating, stretching and heat setting, and the addition and use of bead heaters in the tenter frame to maintain the temperature of the bead edges at the proper operational temperatures in the preheating and stretching sections of the tenter frame as previously described above.

A thermoplastic film was formed by extruding a molten polyethylene terephthalate (PET) polymer from a film forming die onto the surface of a rotating, water-cooled quench drum where it was cooled to produce a substantially amorphous self-supporting film. The cast amorphous film was 40 cm wide, 180 microns thick across its central main portion and 700 microns thick at each bead edge. The edge thickness tapered from the 700 microns edges to the 180 microns thick central sheet over a span of 4 cm. The film was cast at 20 meters a minute. The die was of conventional design, with appropriate means to allow adjustment of the cast film profile by adjusting the die lip opening at a plurality of points along the lip. A nominal opening of 1.3 mm was maintained between the die lips to provide a suitable pressure drop consistent with the viscosity of the polymer and the flow rate.

The cast film was then stripped from the quench drum and transported to the entrance of the tenter frame 11 over heated rollers maintained at 80° C. to raise the film and bead temperatures but avoid sticking of the film and beads to the rollers.

At the entrance of the tenter frame the beaded edges of the film were gripped 15 by tenter clips that were initially open and then closed after the bead edges were introduced into the jaws. The film entering the clips had a temperature of about 50° C.

Immediately past the point where the clip jaws closed on the film beads, a row of three focused radiant heaters 2 were located on each side of the tenter frame, mounted above the film and aimed outward and downward to focus heat toward the bead edges. Each of these heaters consisted of a metal parabolic, cylindrical reflector which was 3.8 cm wide and 28 cm long, with a cylindrical incandescent heating element 25 cm long located at the focus of the parabolic cross-section of the reflector to project nearly parallel rays. Each of the heating elements was rated at 2000 watts maximum electrical input, and actual electrical input was made adjustable from zero to 100 percent of this input by a suitable manually adjustable power controller. The reflector and heater assemblies were mounted so that the heat rays were projected at angles of 45 degrees to the horizontal toward the film beads.

One-half meter downstream from the last of the three radiant heaters 2, the film entered the tenter oven which contained five separate heating zones for preheating 16 the film in preparation for stretching, then stretching the film simultaneously 18 and heat setting 20 (in the last three zones) the stretched film. The film was heated by arrays of flat radiant heaters 17, 19 and 21 mounted 35 cm above the film with the heater power inputs adjustable separately for each of the five heating zones. The heater elements were Casso solar type C heaters, commercially available and designed to preferentially radiate infrared energy outward from their quartz faces, in this case, downward.

The clips were moved in approximately straight parallel paths into the preheating section 16 where the film was heated to a temperature of 94° C.

After the preheating zone 16, the paths of the clips diverged and opposed pairs of clips were accelerated causing them to separate from adjacent pairs to simultaneously stretch 18 the heated film in the machine and cross-machine directions. The film was stretched 3.55 times its original length in the machine direction and 3.55 its original width in the cross-machine direction.

After the stretching zone, the tenter clip paths became approximately parallel again, and the film was heat set by heating it in heat setting zone 20 at a temperature of 200° C. where no further stretching occurred. Heat setting reduces dimensional changes when the film is later reheated, as occurs in subsequent processing or in some end uses. At the tenter frame exit, the film was released 22 from the tenter clips and passed through bead removal knives to a winder which wound the film into rolls.

The film temperature required for uniform stretching and to develop the desired physical properties was controlled by adjusting the power inputs to the infrared film heaters in the preheat zone 16 and in the stretching zone 18 to obtain the desired film temperatures as measured by Ircon infrared pyrometers which viewed the film on the machine centerline at the end of each of the oven heating zones. The following process conditions reliably produced a PET film having consistent physical properties in satisfactorily long roll lengths:

| Process Condition | |
|---|---|
| casting speed | 20 meters/minute |
| stretch ratio, each direction | 3.55 |
| stretching temperature | 94° C. |
| heat setting temperature | 200° C. |
| radiant bead heater power inputs, total for each bead | 4900 watts |

The focused radiant bead heaters 2 provided the necessary increase in bead temperature to obtain freedom from film breaks. Greater power input to the heaters caused undesirable thinning of the film inside the beads due to the spreading of radiant heat onto the film.

EXAMPLE 2

The linear motor tenter frame stretcher described in Example 1 was used to stretch a polyethylene terephthalate (PET) film having an initial thickness of 2.5 mm and having a final stretched thickness of 350 microns. The thicknesses are around the normal upper limit of thickness for oriented polyester films.

Prior to this operation, tests of the tenter clip's ability to grip a sample of the cast PET film 2.5 mm thick showed that the film slipped out of the clip jaws when the film was pulled outward at room temperature. The film temperature was increased by application of hot air from a heat gun and the temperature of the film sample was measured using an embedded fine wire thermocouple. When the film temperature reached 77° C. the clip gripped the film firmly with no slipping.

Then in order to increase the temperature of the bead edges entering the tenter clips from a normal temperature of about 50° C. to above 77° C. prior to the clip gripping point 15, flat sheathed electrical heaters 1 were mounted above and below the beads immediately ahead of the clip gripping point 15 in FIG. 1. The heaters were 20 cm long and 4 cm wide, located 1.2 cm above and below the beads with the radiating surface of the heaters facing the beads. Their maximum electrical input was 250 watts into each of the four heaters operated at full power. The bead temperature increase was about 30° C., resulting in a temperature of about 80° C. at the clip closing point.

The pre-clip closer bead heaters 1 successfully assured gripping of the thick film beads. Without them the thick films slipped out of the clips and the stretching process failed.

EXAMPLE 3

The linear motor tenter frame stretcher described in Example 1 was used to make a highly tensilized polyethylene terephthalate (PET) film having unusually high strength in the machine direction. The high strength was imparted by first casting and stretching the film simultaneously at conditions similar to those described in Example 1, then stretching further in the machine direction. The continued stretching in the machine direction was obtained by adjusting the controls of the linear electric motors to continue accelerating the tenter clips after completion of the simultaneous stretching.

This example utilized the focused radiant heaters 2 as described in Example 1. In addition, hot air nozzles 4, 5 and 6 were located at the boundaries between the heating zones at the start of the simultaneous stretch zone and at the start of the next two zones after the initial stretch zone. The nozzles were mounted to direct air toward the bead edges of the film and were supplied with heated air from conventional air heaters and fans with separate controls for air temperatures and fan speeds for all six nozzles. The supplied air temperature was between 180° and 190° C. The beads themselves were not accessible for temperature measurement.

The maximum machine direction film strength attainable both with and without the added hot air nozzles was determined by measurement of the values of F5, i.e. the stress in a tensile test specimen measured at 5% elongation in a conventional tensile tester. The machine direction stretch ratio (MDX) was the primary process variable affecting the attainable F5.

With other conditions substantially constant, the average and standard deviation of the maximum attainable MDX without bead breakage and the resulting machine direction F5 with and without the hot air bead heaters were as follows.

|  | Without Hot Air Nozzles | With Hot Air Nozzles |
| --- | --- | --- |
| MDX: | 4.71 ± 0.06 | 4.98 ± 0.06 |
| F5: | 188 ± 16 | 232 ± 15 Newtons/sq. mm |
| No. Test Cases: | 7 | 10 |

The advantage gained by the use of these bead heaters was attainment of greater final machine direction stretch ratio because the beads could stretch to higher ratios at higher temperatures without breaking.

EXAMPLE 4

The linear motor tenter frame stretcher described in U.S. Pat. No. 5,051,225 to Hommes et al was used to make an oriented polyethylene naphthalate (PEN) film. Every third tenter clip was driven and two non-driven or idler clips were located between each pair of driven clips.

A thermoplastic film was formed by extruding a molten PEN polymer onto the surface of a rotating, cooled quench drum and cooled to produce an amorphous self-supporting film. The film was 51 cm wide, 44 microns thick across its central main portion and 700 microns thick at each bead edge with the edge thickness tapered from the 700 microns edges to the 44 microns central sheet over a span of 4 cm. The linear speed of the cast film was 18 meters a minute.

Referring to FIG. 1, the cast film was then stripped from the quench drum and transported over heated rollers at 94° C. to the entrance of simultaneous biaxial tenter frame 11 where the beaded edges were gripped 15 by tenter clips. Just prior to the point at which the film entered the clips each bead passed between flat, sheathed electrical heaters 1, which were 25 cm long, 4 cm wide and located 12 mm above and below the film path. The electrical power input to the bead heaters 1 was 500 watts to each heater providing a total of 1000 watts for each of the two beads.

Immediately after the point at which the tenter clip jaws gripped 15 the film, three focused radiant heaters 2 were located on each side of the tenter frame. The electrical power input to the focused heaters was 2000 watts to each heater providing a total of 6000 watts for each of the two beads.

Approximately one-half meter downstream from the final radiant heater the film entered the tenter oven which was divided into five heating zones for preheating 16 the film in preparation for stretching, stretching 18 the film simultaneously and then heat-setting 20 the film in the last three zones. The film was heated by arrays of flat radiant heaters 17, 19 and 21 mounted 35 cm above the film with the heater power inputs adjustable separately for each of the five heat zones. The heater elements were commercial Casso solar type C heaters radiating infrared energy downward from their quartz faces.

In the preheat zone 16, the film heater 17 raised the film temperature to 136° C. measured in the center of the film using an Ircon infrared pyrometer. Tubular, sheathed bead heaters 3 were mounted parallel to the paths of the beads, above the film plane, and as close as practical to both the film plane and the edges of the tenter clips in order to radiate as large a fraction of energy into the beads as possible. These bead heaters 3 were 109 cm long, 0.95 cm in diameter, and had power ratings of 5400 watts for each bead. The power inputs to the heaters on the two edges of the tenter were separately adjustable.

After passing through the preheat zone 16, the film was stretched biaxially and simultaneously in stretching zone 18, at a stretch ratio of 3.3 times in both the machine and cross-machine direction. The film temperature after stretching was 130° C. as measured using a Ircon infrared pyrometer.

After stretching, the film passed through heat setting zone 20 (including three separate heated zones), where no further stretching occurred, and where the film temperature was 160° C., 208° C. and 133° C. in the three zones, respectively. At the exit of the tenter frame, the tenter clips on each side of the tenter frame were forced open 22. The final film, about one meter in width after removal of the bead edges, was wound into rolls.

In this example, PEN films were made by adjusting the various heat inputs to the film and the beads with the preheat zone tubular bead heaters 3 first turned off. The temperature of the beads was measured. Then the preheat zone tubular heaters 3 were turned on and their power inputs were adjusted for best appearance of the beads of the stretched film at the tenter exit and best idler clip spacing. The bead temperature measurements were repeated.

Table I summarizes the bead heating conditions and bead temperatures as measured using an Agema Thermovision thermal imaging camera manufactured by Agema Infrared Systems AB, Sweden. The results give the frequency of film breaks for each set of conditions, the observed difference in idler clip spacing associated with the corresponding bead temperature and the appearance of the stretched bead.

TABLE I

| Process Conditions | A | B | C |
| --- | --- | --- | --- |
| Preheat zone bead heaters 3 | Off | On | On |
| Preheat zone bead heater 3 | 0 | 1080 watts | 1890 watts |

TABLE I-continued

| Process Conditions | A | B | C |
| --- | --- | --- | --- |
| power input | | | |
| Bead temperature ahead of flat sheathed heaters 1 | 65° C. | 65° C. | 65° C. |
| Bead temperature after flat sheathed heaters 1 | 97° C. | 97° C. | 97° C. |
| Bead temperature at oven entrance after focused radiant heaters 2 | 108° C. | 112° C. | — |
| Film temperature at oven entrance | 60° C. | 60° C. | 60° C. |
| Bead temperature at end of preheat zone after tubular bead heaters 3 | 111° C. | 138° C. | 165° C. |
| Film temperature at end of preheat zone | 136° C. | 136° C. | 136° C. |
| Bead temperature at end of stretch zone | 118° C. | 121° C. | 123° C. |
| Film temperature at end of stretch zone | 130° C. | 130° C. | 130° C. |
| Bead breaks in 90 minutes of operation | 20 | 0 | 0 |
| Observed spacing of non-driven tenter clips | Uneven; the two idler clips were close together with larger spaces on either side of each driven clip. | Clips were evenly spaced | Clips were evenly spaced |
| Appearance of stretched bead | Frequent patches of thick, unstretched bead; very hazy | Few un-stretched areas; less hazy | Few un-stretched areas; less hazy |

This example illustrates that:

(a) With the preheat zone bead heaters OFF, (Condition A), the bead temperature was raised only 3 degrees, from 108° to 111° C., while the film temperature was raised from about 65 to 136° C. by the large area radiant film heaters, clearly demonstrating that the film heaters did not reliably heat the beads.

(b) With the beads of the PEN film heated to only 111° C. prior to entering the stretching zone (Condition A), a temperature below the ideal range for stretching PEN, the beads broke 20 times in 90 minutes. With the preheat zone bead heaters ON, the bead temperatures were raised to a suitable stretching temperature of 138° C. (Condition B), approximately equal to the film orientation temperature and the breaks ceased, demonstrating the critical importance of adequate bead temperature for the production of long rolls of oriented polymer films from simultaneous biaxial stretchers.

(c) Satisfactory bead performance was obtained at a temperature above the film orientation temperature (165° C., Condition C), demonstrating that bead temperature can be controlled independently of film temperature.

(d) The uniformity of the PEN film along the edges was adversely affected by incorrect (too low) bead temperatures (Condition A) as the spacing of the idler clips was observed to be uneven until the bead temperature was brought into a suitable range (Conditions B and C).

What is claimed is:

1. In a process for preparing a simultaneous biaxially stretched thermoplastic film by casting a molten melt of thermoplastic polymer and cooling the polymer to form a film having beaded edges, gripping the beaded edges of the film with tenter clips and directing heat onto the film to heat the film to an orientation temperature range prior to stretching the film simultaneously in both the machine and cross-machine directions, wherein the improvement comprises increasing the temperature of the beaded edges of the film to within the film orientation temperature range prior to or during simultaneous stretching by focusing heat on the beaded edges of the film using focused radiant heat from electrical heaters or focused hot air impingement from nozzles.

2. The process of claim 1 wherein the film is simultaneously biaxially stretched at least 2 times its original dimensions in the machine and cross-machine directions.

3. The process of claim 1 wherein the thermoplastic film comprises polyethylene terephthalate having an orientation temperature range of from 80° to 120° C.

4. The process of claim 1 wherein the thermoplastic film comprises polyethylene naphthalate having an orientation temperature range of from 115° to 165° C.

5. The process of claim 1 comprising focusing heat on the beaded edges of the film prior to gripping of the edges with the tenter clips.

6. The process of claim 5 comprising focusing radiant heat on the beaded edges of the film using electrical heaters located above or below the bead edges.

7. The process of claim 1 comprising focusing heat on the beaded edges of the film after the edges of the film are gripped with the tenter clips but before stretching of the film begins.

8. The process of claim 7 comprising focusing radiant heat on the beaded edges of the film using high intensity tubular electrical heaters with cylindrical reflectors located above or below the bead edges.

9. The process of claim 7 comprising focusing radiant heat on the beaded edges of the film using electrical tubular sheathed heaters located above the bead edges and close to the tenter clips to maximize heat input to the beads.

10. The process of claim 1 comprising focusing heat on the beaded edges of the film during simultaneous biaxial stretching of the film.

11. The process of claim 1 comprising focusing heat on the beaded edges of the film during simultaneous biaxial stretching and subsequent heat setting of the film.

12. The process of claim 1 comprising focusing heat on the beaded edges of the film during simultaneous biaxial stretching and during further stretching of the film in the machine direction.

13. The process of claim 1 comprising cooling the polymer to form a cast film having a thickness of less than 250 microns with beaded edges having a thickness of from 400 to 1000 microns.

14. The process of claim 13 wherein the cast film formed has a thickness of less than 250 microns with beaded edges having a thickness of from 600 to 800 microns.

15. A process for preparing a thin, biaxially stretched polyethylene terephthalate film comprising the steps of:

(a) casting a molten polymer of polyethylene terephthalate onto a quenching surface and cooling the polymer to form a self-supporting film having beaded edges;

(b) gripping the beaded edges of the film with tenter clips;

(c) moving the film into a tenter frame;

(d) heating the film to an orientation temperature range of from 80° to 120° C. in the tenter frame prior to stretching; and (e) simultaneously stretching the film biaxially to form a biaxially stretched polyester film, wherein the temperature of the beaded edges of the polyester film is increased to within the orientation temperature range prior to or during simultaneous stretching by focusing heat on the beaded edges of the film using focused radiant heat from electrical heaters or focused hot air impingement from nozzles.

16. The process of claim 15 comprising the additional step(f) of heat setting the polyester film at a temperature of from 185° to 220° C.

17. A process for preparing a thin, biaxially stretched polyethylene naphthalate film comprising the steps of:

(a) casting a molten polymer of polyethylene naphthalate onto a quenching surface and cooling the polymer to form a self-supporting film having beaded edges;

(b) gripping the beaded edges of the film with tenter clips;

(c) moving the film into a tenter frame;

(d) heating the film to an orientation temperature range of from 115° to 165° C. in the tenter frame prior to stretching; and (e) simultaneously stretching the film biaxially to form a biaxially stretched polyester film, wherein the temperature of the beaded edges of the polyester film is increased to within the orientation temperature range prior to or during simultaneous stretching by focusing heat on the beaded edges of the film using focused radiant heat from electrical heaters or focused hot air impingement from nozzles.

18. The process of claim 17 comprising the additional step (f) of heat setting the polyester film at a temperature of from 185° to 245° C.

* * * * *